May 6, 1941. N. P. EASLING Re. 21,791

TERMITE REPELLENT

Original Filed Feb. 10, 1938

N. P. Easling
INVENTOR.

BY C. A. Snow & Co.

ATTORNEYS.

Reissued May 6, 1941

Re. 21,791

UNITED STATES PATENT OFFICE 21,791

TERMITE REPELLENT

Newton P. Easling, Pekin, Ill., assignor to The E. L. Bruce Company, Memphis, Tenn., a corporation of Delaware Original No. 2,139,225, dated December 6, 1938, Serial No. 189,848, February 10, 1938. Application for reissue August 2, 1940, Serial No. 349,987

7 Claims. (Cl. 43—107)

This invention relates to a termite repellent and is a continuation in part of an application filed by me on July 22, 1936, Serial No. 92,019.

It is an object of the invention to provide a termite repellent formed of felt paper, or the like such as often used for lining floors, insulating walls, and for other construction purposes.

An object is to provide a paper of this character which is proof against the ravages of termites and other destructive insects.

A further object is to provide a paper which can be produced at low cost.

A still further object is to so position the paper between the foundations and superposed structures of buildings as to constitute a trap which cannot be passed by the termites and which, in itself, is destructive of the pests.

With the foregoing and other objects in view the invention consists in impregnating felt paper or the like with an insect repelling and/or destroying material.

The invention also consists in so arranging superposed layers of paper treated as above, so as to constitute a trap whereby it becomes impossible for the pests to pass from the foundation of a building to the superstructure thereon or from said superstructure to the roof.

The invention also consists in so treating the paper as to render it pliable and weather-resisting.

In carrying out the invention the ingredients used can vary both in proportions and kinds. In one form of the invention it is intended to use powdered arsenate of lead with paint in which mineral pitch or asphalt is the base. Where arsenate of lead is used the proportions would be twenty-five per cent arsenate of lead and seventy-three per cent paint. Should other arsenate compounds be used, the amount employed would be increased or reduced so as to equal in strength and effectiveness the twenty-five per cent arsenate of lead herein mentioned. With the foregoing ingredients there can be mixed approximately one per cent nicotine sulphate and one per cent inert ingredients.

Instead of employing the mixture above described the impregnating material can consist of nicotine sulphate, five per cent; oil of amber, forty-five per cent; and crude oil or kerosene or fuel oil, fifty per cent. These proportions can of course be varied to meet requirements.

Either of the formulas above described can be prepared by mixing the ingredients thoroughly by stirring or agitating in any other manner. Following the manufacture of the felt paper or the like in sheet form and before it is packaged, the same is impregnated with the mixture which is applied to one or both surfaces of the paper by any means found suitable.

After the paper has dried it is packaged and thereafter can be used whenever desired in the same manner as ordinary felt paper. It can be laid under floors or placed between foundations and superstructures or between the walls of buildings and the roofs.

When the paper is placed between a foundation and a wall or between a wall and a roof, it is preferred to form a trap thereof as shown in the accompanying drawing in which Figure 1 is a section through a portion of a building showing the improved trap in position.

Figure 1:
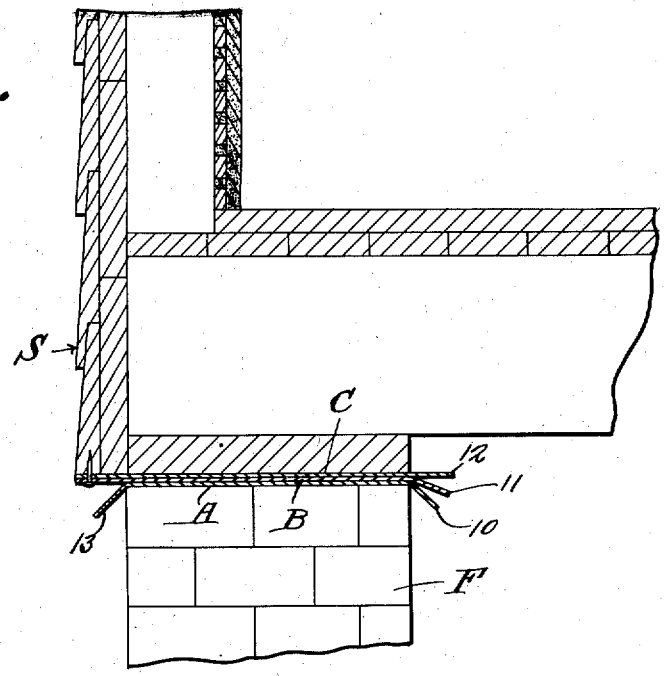
Figure 2:
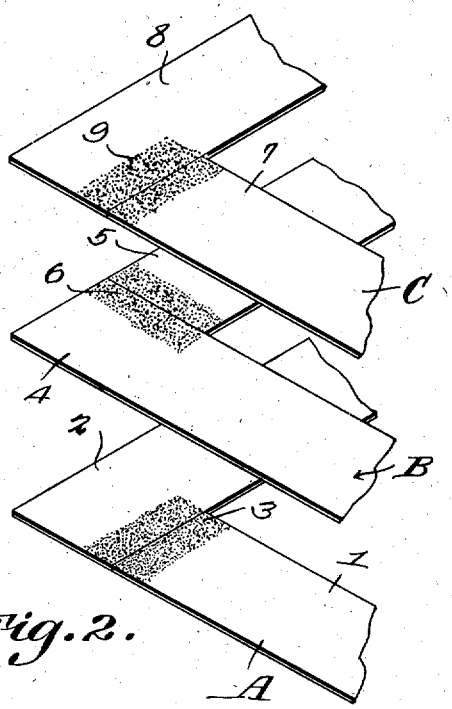
Figure 2 is a perspective view of superposed layers of paper, said layers being spaced apart.
Figure 3:
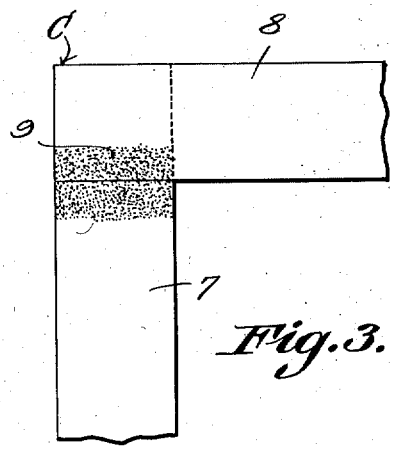
Figure 3 is a plan view of the trap after the layers have been assembled.

The sheets of treated paper used in forming the trap are wider than the foundation on which they are to be placed, it being preferred to extend them approximately two inches beyond each side surface of the foundation. Preferably three superposed layers are employed. The lower layer A is made up of abutting strips 1 and 2, the strip 2 being extended to the corner portion of the foundation, and the meeting portions of the two strips being treated with asphalt paint as shown at 3 so as to seal the space between the strips and also to provide an adhesive surface. Thereafter the second layer B of the trap is placed in position. This also consists of abutting strips 4 and 5, the end portion of strip 4 being extended across the painted joint of the lower layer and out to the corner of the foundation, while the other strip 5 abuts against the strip 4, the joint between the two strips being sealed with a heavy coating of asphalt paint indicated at 6. The third layer C of the trap is then placed in position and this also consists of two strips 7 and 8, the strip 8 being extended across the joint in the layer B while strip 7 abuts against the strip 8, the joint being heavily coated with asphalt paint as shown at 9.

After the layers of the trap have been placed in position on the foundation with their edge portions extending beyond the inner and outer surface thereof, the superstructure S is erected. The lower layer A which is nearest the foundation F has its free edge portions bent downwardly. The inner edge portions of the layers B and C are spread apart from each other and from the layer A so that inwardly diverging aprons 10, 11 and 12 thus are provided. The outer edge portion of layer A is inclined downwardly as shown at 13 while the outer edge portions of the layers B and C are firmly nailed or otherwise secured to the adjacent portion of the superstructure S.

Obviously a trap formed of treated paper as herein explained and constructed as pointed out, will not only check the advance of the termites from the foundation F to the superstructure S but it will retard such advance for so long a period that the termites will be destroyed by the chemical contents of the paper before they can reach the superstructure.

An arrangement similar to that shown in the drawing can also be provided between the wall and roof of a structure if found desirable.

What is claimed is:

1. In a building construction the combination with separate structures supported one upon the other, of an interposed termite trap including superposed layers of paper saturated with a termite poison, said layers having side edges extending outwardly and inwardly from the engaged structures, the said edges being spread apart.

2. In a building construction the combination with separate structures supported one upon the other, of an interposed termite trap including superposed layers of paper saturated with a termite poison, said layers having side edges extending outwardly and inwardly from the engaged structures, the said edges being spread apart, each layer comprising abutting strips forming joints, and an asphalt paint applied to the joints for sealing them and for joining the superposed layers, the strips of each layer lapping the joint of the next adjoining layer.

3. A termite trap for use in building construction between separate structures supported one upon the other comprising superposed layers of paper saturated with a termite poison, said layers having side edges adapted to extend outwardly and inwardly from the said structures, the said edges being spread apart, each layer comprising abutting strips forming joints, the strips of each layer lapping the joint of the next adjoining layer.

4. In a building construction having separate structures supported one upon the other, a termite trap comprising a sheet of material of greater width than the underlying supporting structure and extending beyond the supporting structure and having along a side spaced apart edges constituting a trap.

5. In a building construction having separate structures supported one upon the other, a termite trap comprising a sheet of material of greater width than the underlying supporting structure and extending beyond the supporting structure and having along a side spaced apart edges constituting a trap, an edge being secured to the superstructure and another edge being bent downwardly.

6. A termite trap for use in building construction comprising a sheet of material carrying a termite poison, said sheet having along a side, separated edge portions to provide a space constituting a trap.

7. A termite trap for use in building construction comprising a sheet of material, said sheet having along a side, separated edge portions to provide a space constituting a trap.

NEWTON P. EASLING.